United States Patent [19]

Fretwell

[11] Patent Number: 5,253,973

[45] Date of Patent: Oct. 19, 1993

[54] VEHICLES AND VEHICLE LIFTS

[75] Inventor: Percy Fretwell, Nordern, England

[73] Assignee: Ricon UK Limited, Manchester, England

[21] Appl. No.: 681,542

[22] PCT Filed: Nov. 3, 1989

[86] PCT No.: PCT/GB89/01316

§ 371 Date: May 3, 1991

§ 102(e) Date: May 3, 1991

[87] PCT Pub. No.: WO90/05072

PCT Pub. Date: May 17, 1990

[30] Foreign Application Priority Data

| Nov. 5, 1988 | [GB] | United Kingdom | 8825951 |
| Mar. 16, 1989 | [GB] | United Kingdom | 8906059 |
| May 17, 1989 | [GB] | United Kingdom | 8911276 |

[51] Int. Cl.⁵ .............................................. B60P 1/44
[52] U.S. Cl. ............................... 414/558; 414/917; 414/549; 414/545; 414/541; 414/742
[58] Field of Search .......... 414/546, 549, 554, 556, 414/557, 558, 560, 550, 462, 545, 539, 540, 541, 542, 917, 921, 522, 742, 728; 187/9 R

[56] References Cited

U.S. PATENT DOCUMENTS

| Re. 30,462 | 12/1980 | Pohl | 414/545 |
| 2,391,813 | 12/1945 | Wood . | |
| 2,457,380 | 12/1948 | Kelberer . | |
| 2,774,494 | 12/1956 | Malmstrom . | |
| 2,785,807 | 3/1957 | Prowinsky | 414/917 XV |
| 4,058,228 | 11/1977 | Hall . | |
| 4,134,504 | 1/1979 | Salas et al. . | |
| 4,325,668 | 4/1982 | Julian et al. | 414/546 |
| 4,466,771 | 8/1984 | Thorley et al. | 414/545 XR |
| 4,579,503 | 4/1986 | Disque | 414/558 |
| 4,685,860 | 8/1987 | McFarland . | |
| 4,711,613 | 12/1987 | Fretwell | 414/558 XV |
| 4,880,347 | 11/1989 | Lombard | 414/541 XR |
| 4,909,700 | 3/1990 | Fontecchio et al. | 414/549 |

FOREIGN PATENT DOCUMENTS

| 47730 | 11/1981 | European Pat. Off. . |
| 217467 | 4/1987 | European Pat. Off. . |
| 3531853 | 3/1987 | Fed. Rep. of Germany . |
| 8803484 | 5/1988 | PCT Int'l Appl. . |
| 1226489 | 3/1971 | United Kingdom . |
| 2107671A | 5/1983 | United Kingdom . |
| 2138772A | 10/1984 | United Kingdom . |
| 2152470A | 8/1985 | United Kingdom . |
| 2207113A | 1/1989 | United Kingdom . |
| 2212132A | 7/1989 | United Kingdom . |

Primary Examiner—Frank E. Werner

[57] ABSTRACT

A lift for attachment to a vehicle for moving mobility-impaired passengers between lowered and raised positions for entry and exit. A platform (27) is affixed to an unequal modified parallelogram structure (20), the combination being supported on movable rails (40,41) and carried by rollers (90, 91) for movement by an electric motor (52) between extended and retracted positions in relation to the vehicle. The rails (89) may define a curved portion (89b) to change orientation of the platform combination for storage to an inclined position. The unequal modified parallelogram structure (20) is actuated by a hydraulic ram (34) acting through pivot plates (17, 18) on a common transverse axis (34a) with the upper members of the parallelogram structure (20) to raise and lower the platform (27) so as to incline slightly downward when raised and slightly upward when lowered. The platform may be sectioned with a pivoted part affording a step for the vehicle. The whole lift is capable of being totally in a stowed position for protection from environmental elements.

10 Claims, 13 Drawing Sheets

VEHICLES AND VEHICLE LIFTS

This invention relates to vehicles and vehicle lifts.

According to one aspect of the invention a vehicle lift comprises lift structure movable relative to a support between and outer positions, the lift structure comprising inner mounting structure and an outer platform, a parallelogram arrangement having an outer pivotal connection to the platform and an inner pivotal connection to the mounting structure, the inner pivotal connection comprising upper and lower pivots, and motive means for raising and lowering the parallelogram arrangement, the means being connected to the parallelogram spaced from the upper pivot.

There may be two laterally spaced parallelogram arrangements having coaxial upper pivots, the parallelogram arrangements being connected by intermediate structure pivoted to the mounting structure coaxial with the upper pivots, the motive means being pivoted to the intermediate structure.

The motive means may comprise a ram.

The support may comprise spaced rails curved at an outer region so that the platform changes its orientation to the rails as the lift structure is moved between inner and outer positions.

The platform may be adapted to form a step in the raised position.

The parallelogram may be modified to change the inclination of the platform in the raised position.

The term platform is intended to include any load-supporting structure.

The invention in another aspect includes a vehicle lift comprising a platform movable between extended and retracted positions, the platform in the extended position being movable between lower and raised positions, the platform being adapted to form a step in a raised position.

The invention in another aspect includes a vehicle lift comprising a platform which can be raised and lowered by means comprising a parallelogram arrangement, in which the parallelogram is modified to change the inclination of the platform in a raised position.

From another aspect the invention provides a vehicle lift including structure movable on rails, the rails comprising an exposed elongate element spaced from a support and engageable by rollers of the structure.

The invention further provides a vehicle lift comprising mounting structure movable relative to a support between inner and outer positions, lifting structure comprising a platform and movable relative to the mounting structure between upper and lower positions independently of the position of the movable structure relative to the support between said positions.

The invention includes a vehicle having a lift as above, in particular with the support below a floor of the vehicle.

The invention further provides a vehicle lift mounted beneath a floor of a vehicle and having support structure and lift structure movable relative to the support structure in a direction inclined to the horizontal between withdrawn and extended positions, the lift structure including a platform movable up and down in the extended position.

The invention may be performed in various ways and some specific embodiments with possible modifications will now be described by way of example with reference to the accompanying drawings, in which:

Referring to FIGS. 1 to 5, a vehicle lift 10 comprises a mounting structure 11 comprising fabricated side members 12, 13 fixed to cross-members 14, 15 with bracing 16. Parallel plates 17, 18 are fixed to the cross members parallel to members 12, 13.

Figure 3:
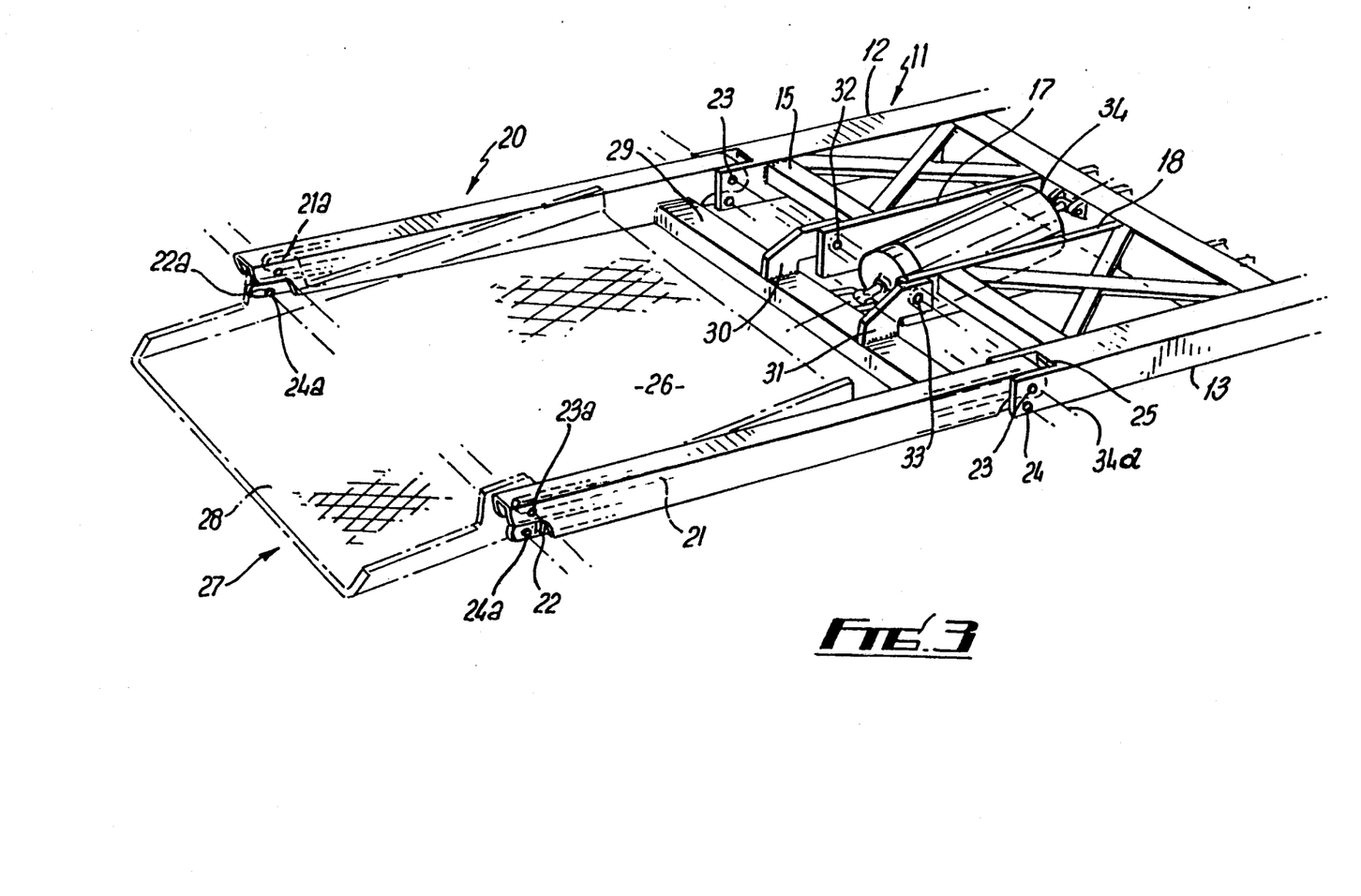
FIG. 3 is a perspective view of another part of the lift.
Figure 5:
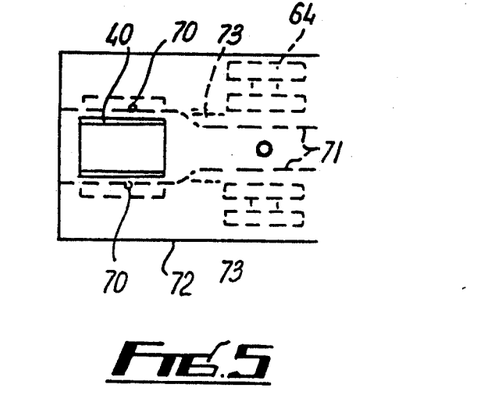
FIG. 5 is a plan view of the lift.

A parallelogram arrangement 20 comprises two pairs of upper and lower side elements 21, 22 and 21a, 22a (FIG. 3). The elements in each pair at one end are pivoted at 23, 24 between the sides of members 12, 13 with cut-out 25. At their other ends the elements 21, 22 are pivoted at 23a, 24a to the front of a rear part 26 of a flat platform 27 having a front part 28 which is pivoted to the front of the part 26 so as to be movable between an open position (FIG. 3) and a closed position (B in FIG. 1). The platform is shown open in full line in FIG. 1. The elements in each pair 21, 22 and 21a, 22a nest within each other at all times so that no gap exists between them as viewed sideways; this is a safety feature.

Towards their rear ends the upper elements 21, 21a are connected by a cross-member 29 to which are fixed two arms 30, 31 (also see FIG. 10a) respectively pivoted to plates 17, 18 at 32, 33 on a common transverse axis 34a (FIG. 3) which is in line with pivots 23. A hydraulic piston/cylinder ram 34 (FIG. 2) is located between plates 17, 18 and the piston 35 is pivoted at 36 to cross member 29 and the cylinder pivoted at 37 to cross member 14. Pivot 36 is spaced from axis 34.

Figure 1:
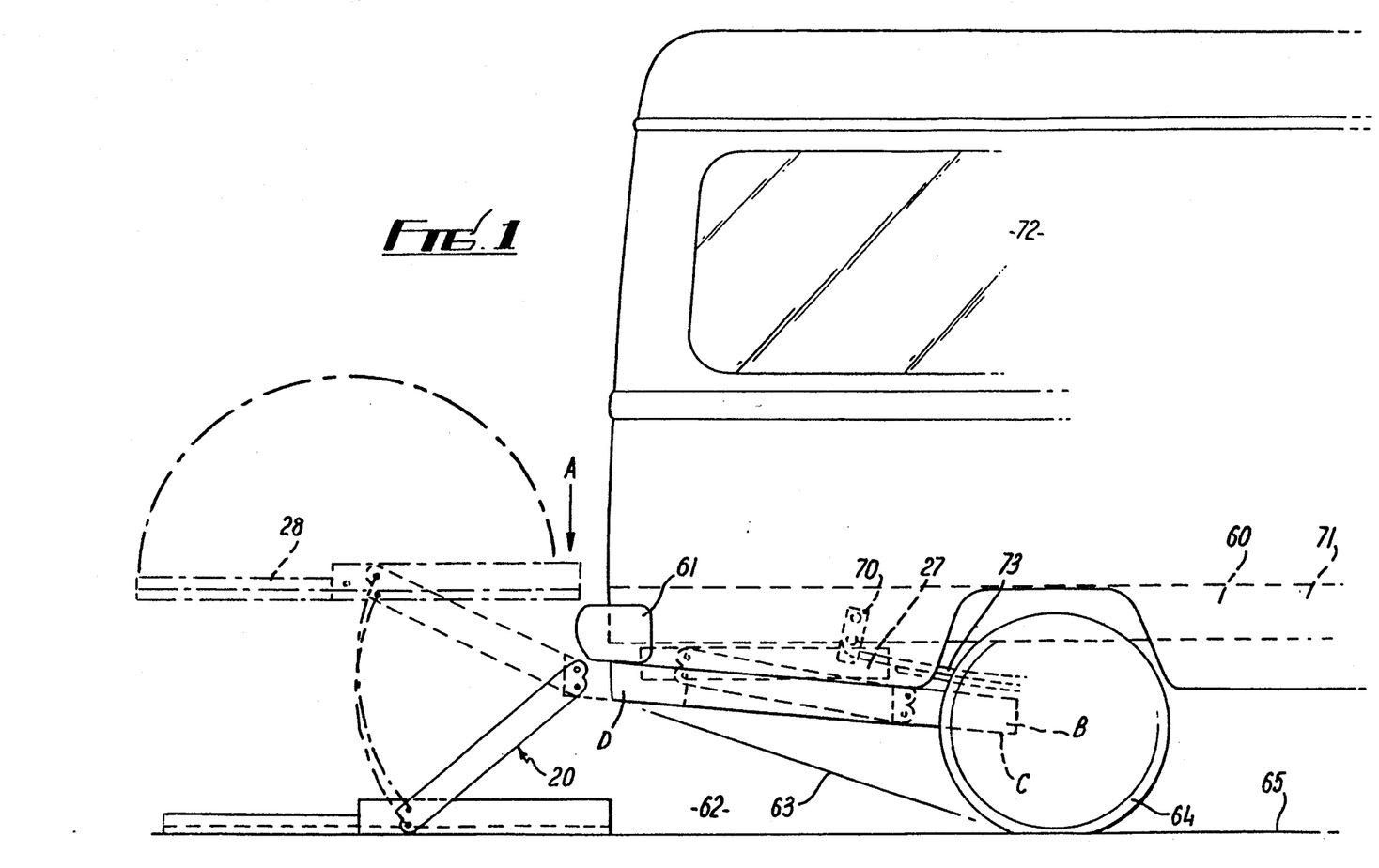
FIG. 1 is a side view of a vehicle with lift.

When the ram 34 is energized and deenergized the parallelogram arrangement 20 is pivoted up and down (see FIG. 1). In use, the platform remains somewhat horizontal.

The mounting structure 11 (FIG. 2) is movable between side rails or supports 40, 41 between an outer or operative position (FIG. 2) and an inner or inoperative position, shown dotted at B in FIG. 1. Any suitable means may be used but as shown the outer faces 42 of members 12, 13 are provided with two or more spaced bosses 43 having upper and lower plastics pieces 44, 45 in sliding engagement with plastics liners 46, 47 on the confronting faces of the upper and lower arms of the rails 40, 41. Brackets 48 (only one shown, FIG. 2) are respectively fixed to the members 12, 13 and are secured to respective chains 49 extending round sprockets 50, 51 secured to the rails 40, 41. A motor 52 e.g. electric, can rotate the sprockets 51 on a common axle (not shown) to move the structure 11 in and out on the rails.

It will be understood that because the elements 21, 22 and 21a, 22a are inwards of rails 40, 41 the ram 34 can be operated to raise or lower the platform at all positions of the structure in relation to the rails 40, 41.

The lift 10 is intended primarily for use by the disabled and handicapped, in particular with wheel-chairs, and for mounting beneath the floor 60 (FIG. 1) of a vehicle. FIG. 1 illustrates mounting beneath the rear of a vehicle having a rear door, and rear bumper 61.

If there is sufficient room beneath the vehicle the lift can be mounted with rails 40, 41 horizontal. However it is often the case that vehicle structure beneath the floor 60 would prevent this unless the lift structure undesirably enters into the space 62 beneath the minimum angle of departure 63 which normally extends upwards and rearwards from the point of contact between the rear wheels 64 and ground 65. Thus in the example of FIG. 1, brackets 70 are fixed to spaced fore-and-aft chassis members 71 of a monocoque body 72, and act as rear mounting for leaf springs 73. In the present lift, the rails 40, 41 can be mounted on the vehicle so as to be inclined upwards as they extend rearwards so that the inner ends C (FIG. 1) of the rails are below the springs 73 but the outer ends D are not beneath the angle of departure but are still beneath the bumper 61.

The pivots 23, 24 and 23a, 24a (FIG. 3) are vertically spaced. The platform 27 remains, somewhat horizontal.

Figure 13:
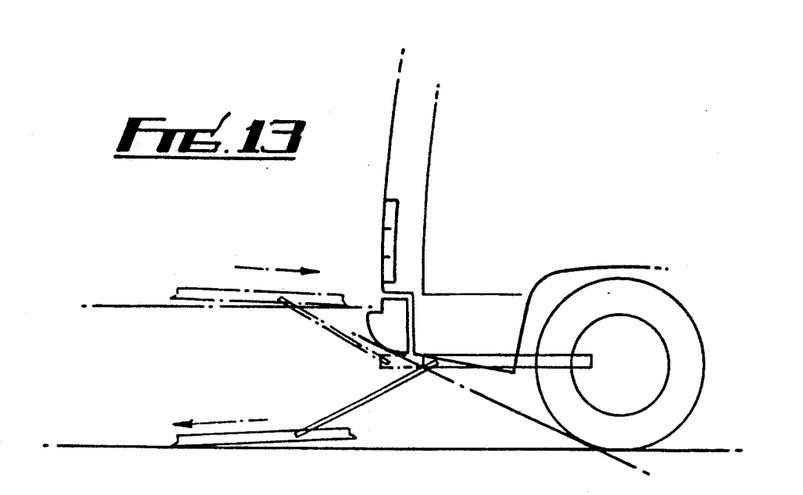
FIG. 13 shows operation of a lift.

If desired the parallelogram can be modified so that the separation between pivots 23, 24 may be slightly (e.g. 2 mm) less than the separation between pivots 23a, 24a, as illustrated in FIG. 13, so that in the down position the platform inclines slightly downwards as it extends outwards and in the top position the platform is inclined slightly upwards as it extends outwards. This is a safety feature. The term parallelogram arrangement should be understood as including such an arrangement.

In the withdrawn position the platform can be raised between the rails to be parked between the chassis members 71 (FIG. 1), subject to their spacing, and lightly held in contact with the body to resist rattle.

Figure 6:
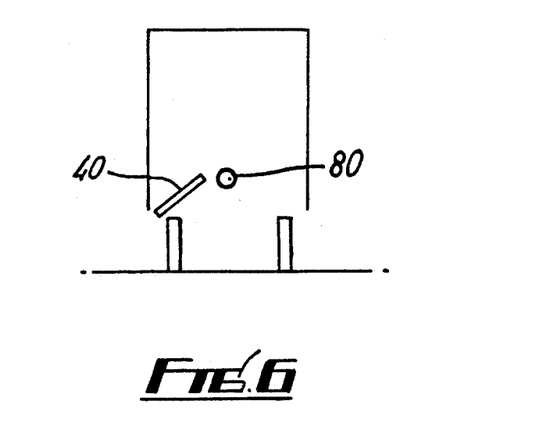
FIG. 6 is a rear view of another arrangement.

The lift can be mounted to extend sideways and as shown in FIG. 6 the rails may in some cases incline downwards enabling the lift to be mounted in cases where the prop shaft 80 would effectively prevent horizontal mounting.

Figures 2, 4:
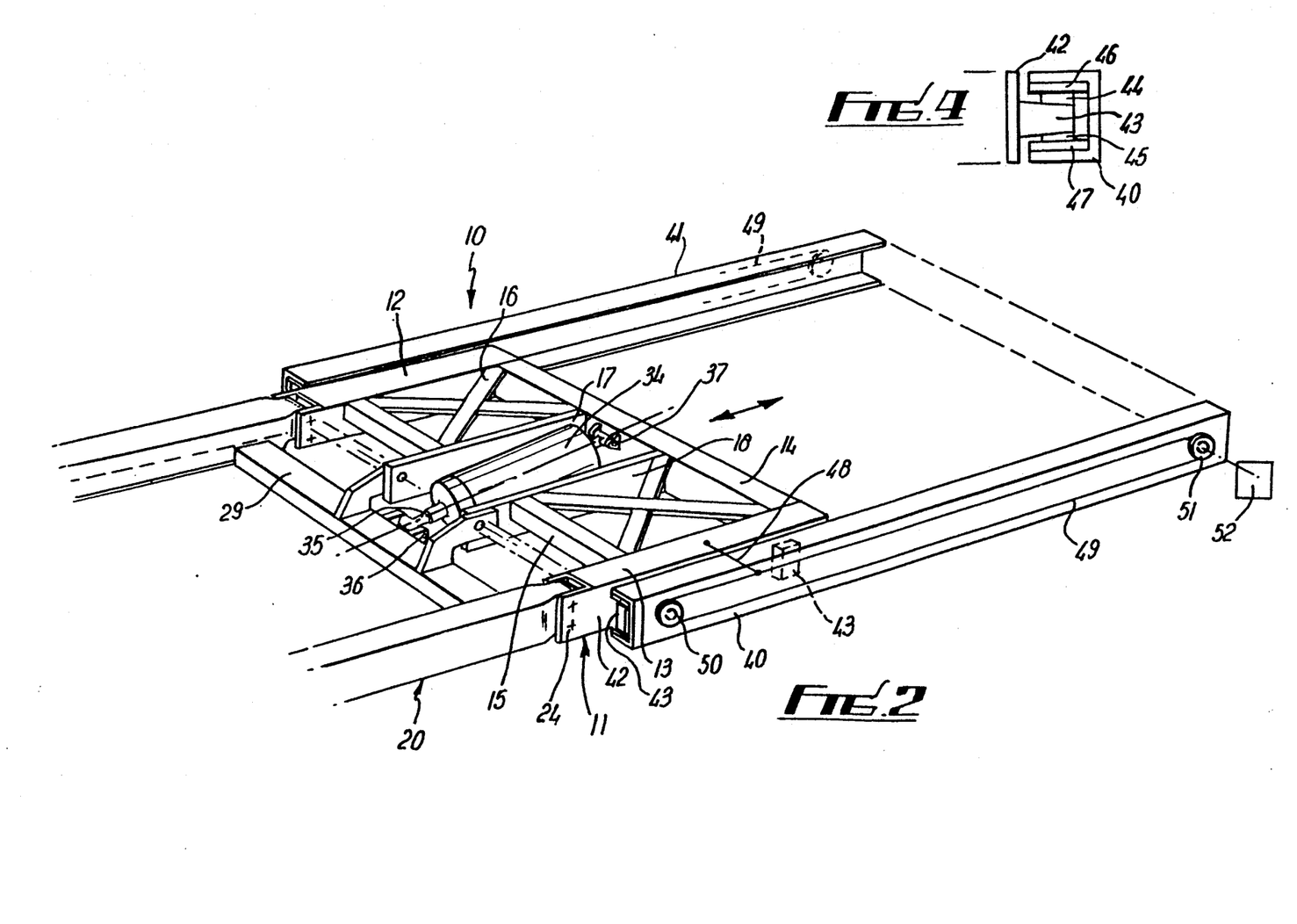
FIG. 2 is a perspective view of part of a lift.
FIG. 4 is a section through part of FIG. 3.
Figure 7:
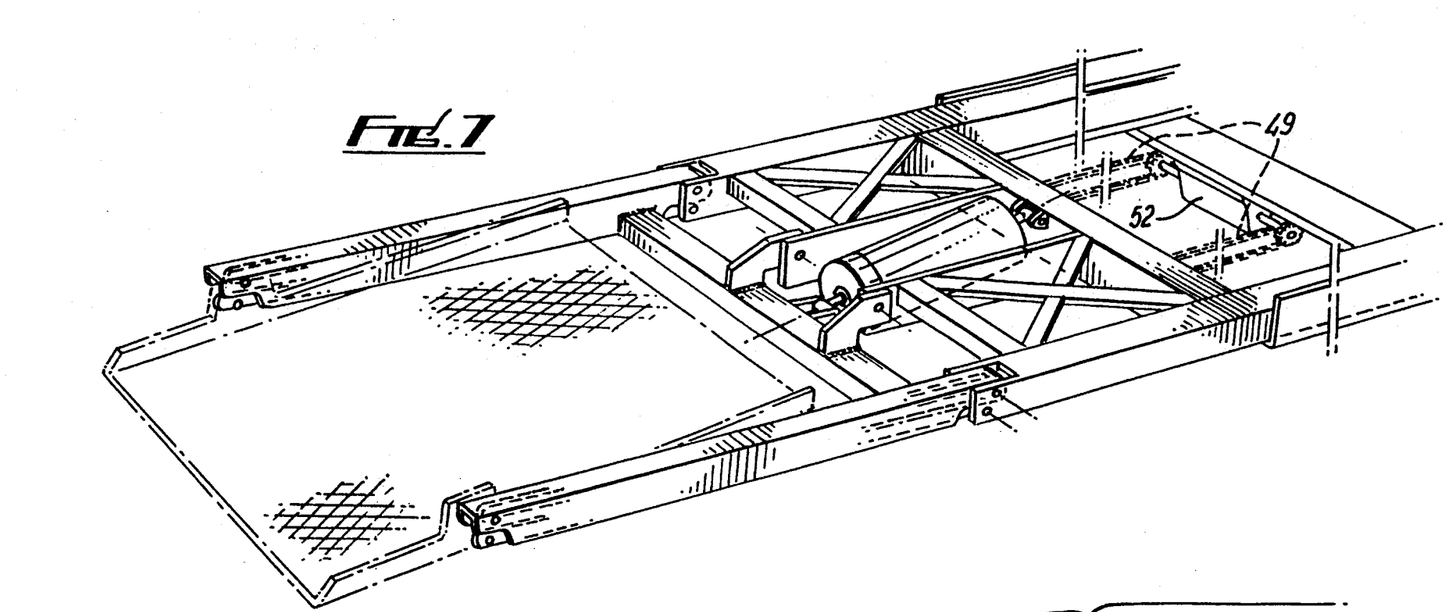
FIG. 7 is similar to FIG. 3.
Figure 8:
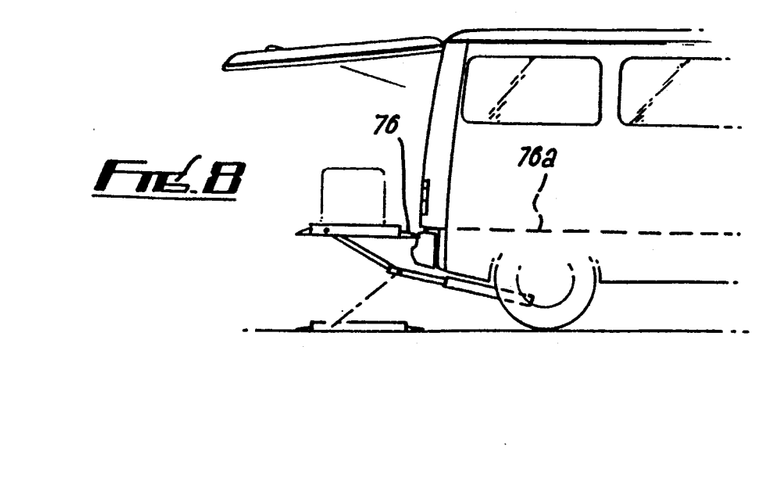
FIG. 8 shows operation of the lift.

FIG. 7 is generally similar to FIGS. 2 and 3 but the motor 52 is central. FIGS. 8 shows operation of a lift in association with a rear door of a vehicle. The platform may have a pivoted flap 76 to bridge any gap between the platform and the floor 76a of the vehicle.

Figure 9:
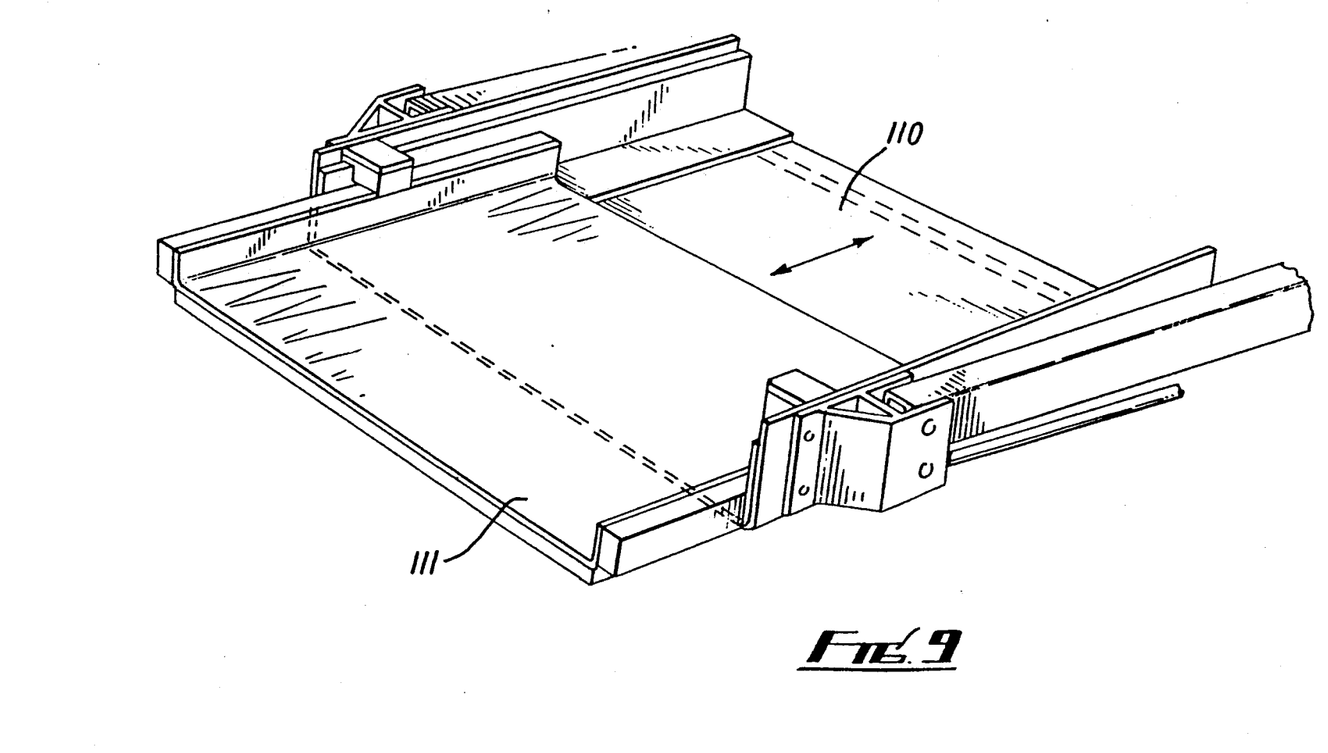
FIG. 9 shows a modified platform.

As shown in FIG. 9 the platform can be in two parts 110, 111 which are slidably cooperable. In this way the platform can be manually extended.

Figures 10A, 10B:
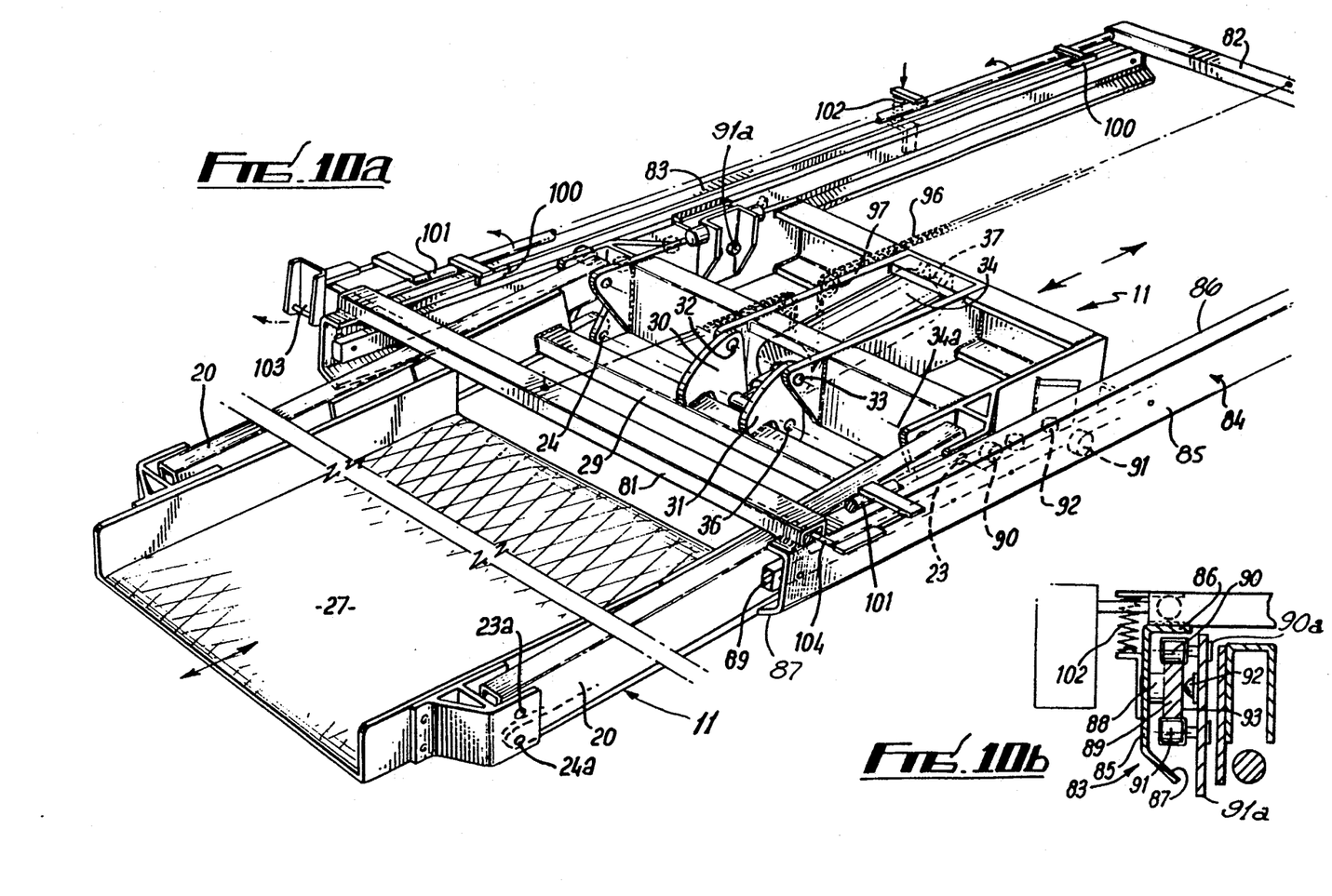
FIGS. 10A, 10B show a modified lift.

The arrangement of FIGS. 10A, 10B is similar to FIGS. 2, 3 but, as shown, is intended for sale as a kit of parts and cross-members 81, 82 are fixed to rails 83, 84. The cross-members 81, 82 can be omitted if the rails are individually fitted to the vehicle. In this arrangement the rails 83, 84 have a vertical web 85, an inwardly directed horizontal arm 86 at the top of web 85 and a downwardly and inwardly inclined web 87 at the bottom of web 85.

Figure 11:
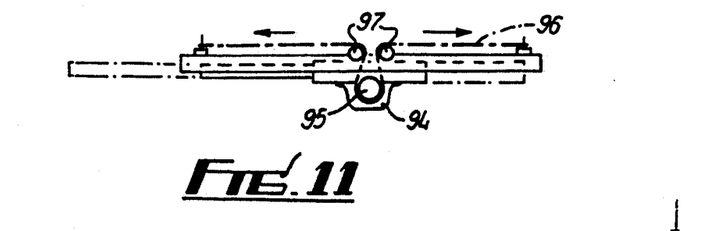
FIG. 11 shows a drive system.
Figure 12:
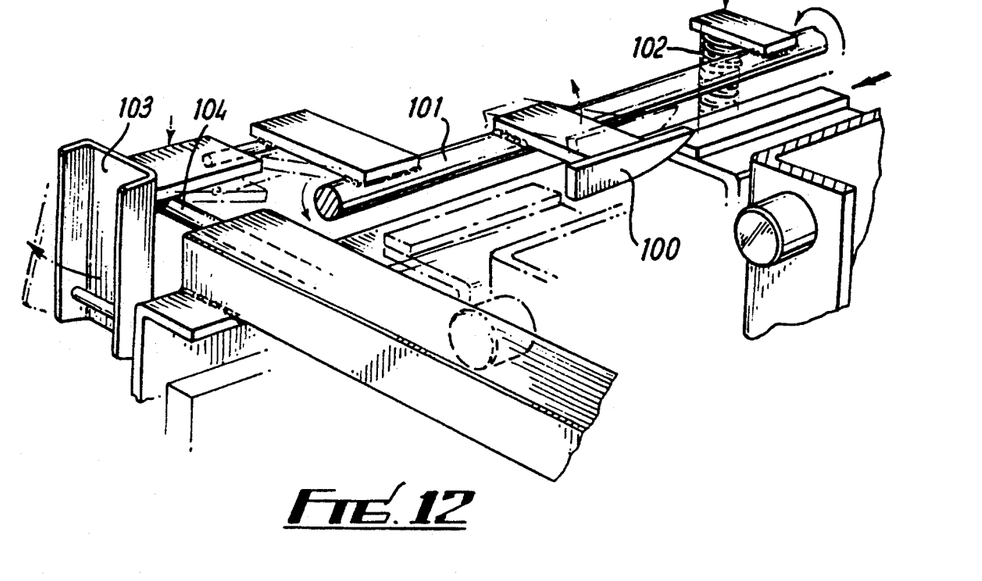
FIG. 12 is an enlarged view of part of FIG. 10A.

Spaced along the inner face of web 85 are spacers 88 to which is connected an elongate running rail 89 and each side of the structure 11 is provided with rollers 90, 91, engaging the upper and lower edges of rail 89, and rollers 92, rotating about vertical axes, engaging the inner face 93 of exposed rail 89. The rollers 92 are carried on the mounting structure 11 along with the rollers 90, 91 affixed by a pair of studs 90a, 91a (see FIG. 10a upper center). This arrangement resists accumulation of dirt as might interfere with proper operation, the dirt tending to wash or fall out of rails 83, 84. The structure 11 is moved in and out by motor 94 (FIG. 14) driving sprocket 95 engaging chain 96 which extends over sprockets 97 and is connected at its ends to cross members 81, 82 (see FIG. 11). As before the rails 83, 84 could be inclined.

Releasable means may hold the structure 11 in a forward and rearward position. These means could be remote controlled but as shown comprise latches 100 (FIG. 10a) engageable behind or in front of parts of structure 11 and connected to rods 101 which can be rotated, against the bias of springs 102, by handle 103 to move the latches from the path of structure 11, a transverse rotatable rod 104 connecting the latch mechanisms at the two sides.

In another arrangement a manually releaseable sneck-type latch hook is mounted on the cross-members 81, 82 cooperable with latches on the front and rear of structure 11.

The ram 34 is inclined downwards and pivots on bar 36 fixed to plates 30, 31 at a position spaced from and lower than axis 34a. The plates 30, 31 are fixed to cross member 29 fixed to upper parallelogram elements 21.

A feature of FIG. 10a, which can be used in the other embodiments in which the platform slightly changes its orientation as it is moved up and down, is that the lower arms 22, 22a of the parallelogram can be slightly reduced in length compared with upper arms 21, 21a. This controls (FIG. 13) the position at which the platform is horizontal as it moves between an incline slightly downwards as it extends outwards when in the lowered position and an incline slightly upwards as it extends outwards in the raised position. The term parallelogram arrangement should be understood as including this modification.

Figure 14:
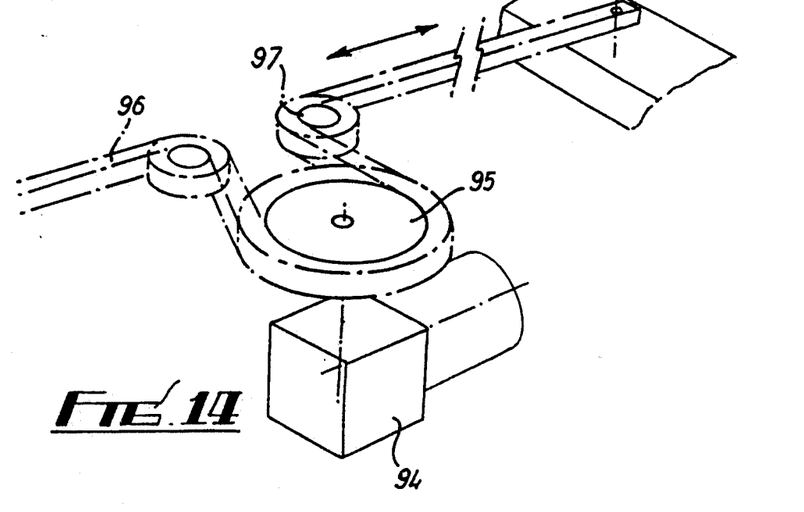
FIG. 14 shows a modification.

In a modification FIG. 14 the sprockets 97 are positioned on top of structure 11 for rotation about vertical axes; this is for cases in which there is appropriate room beneath the vehicle, and provides an alternative drive means for the structure 11 which may enable the overall height of the lift 10 to be reduced.

Figure 15:
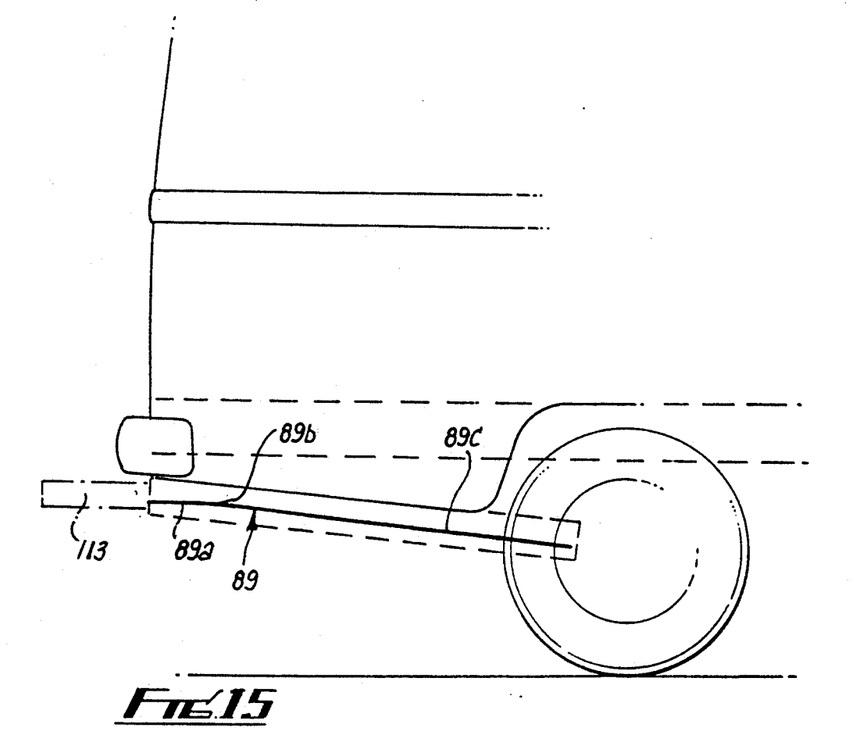
FIGS. 15, 16, 16A show a modification.
Figures 16, 16A:
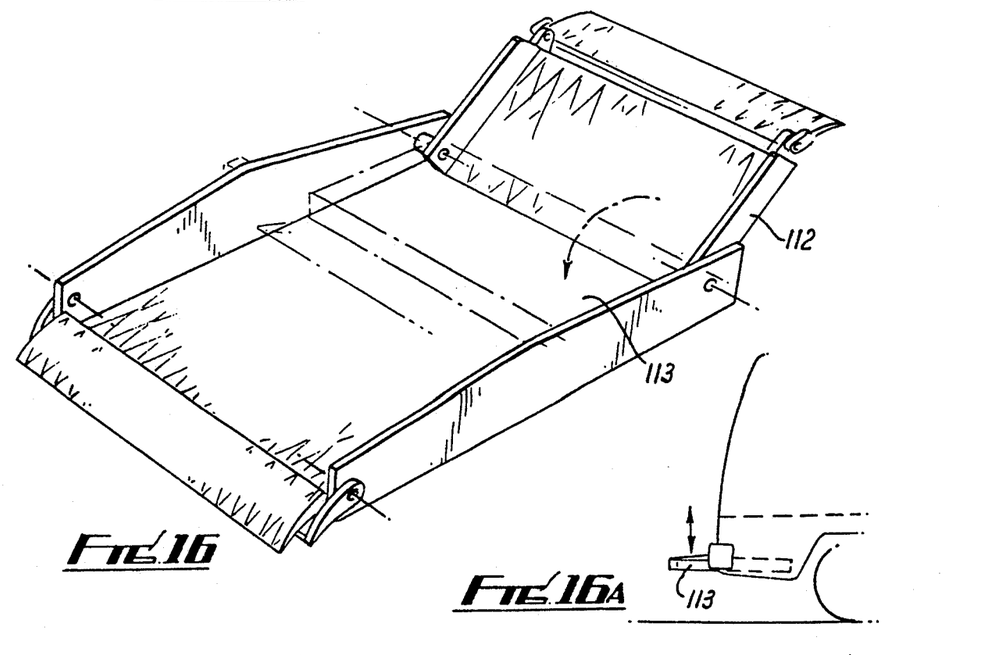

In an advantageous embodiment of FIGS. 15, 16, 16A the platform has a pivoted part 112 which, in the raised and extended, or an intermediate and extended, position, can be folded inwards to form a step 113.

The extent to which the platform is raised by the ram can be adjusted by changing the position of pivot 36.

Figure 17:
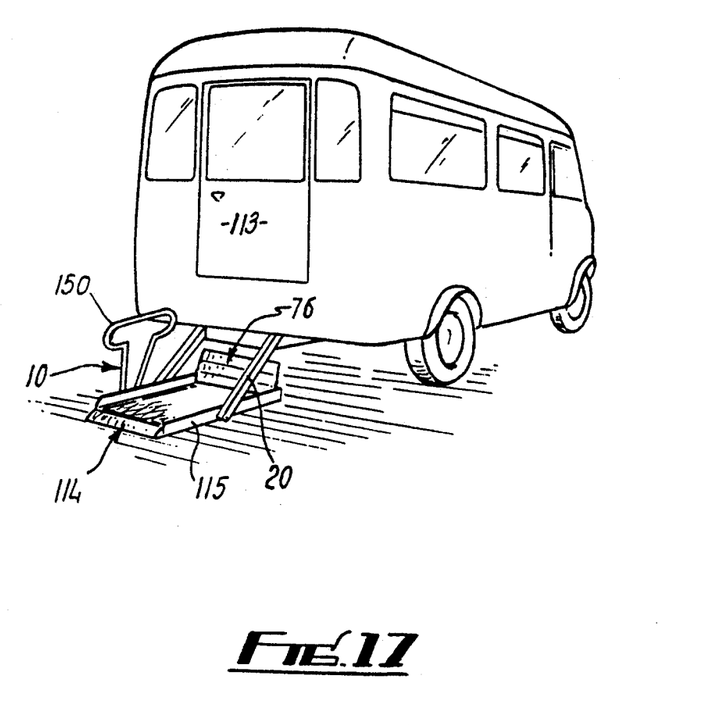
FIG. 17 shows a vehicle with rear lift.

FIG. 17 shows a vehicle with rear door 113 and lift 10 having a platform 115 movable by, for example, a parallelogram lift device between lowered position on the ground and a raised position providing entry to the door. The door could be on the vehicle side. The lift may be stowable, for example beneath the vehicle floor, by a rotary action or sliding action.

The platform has an inner part 76 which forms a stop and a bridge plate and an outer part 114, which forms a wheel-chair stop and a ramp.

The part 114 automatically moves to a raised (wheel-chair stop) safety position when the platform is raised away from the ground, and automatically forms a ramp when the platform is in contact with the ground. The down ramp provides an upwardly inclined surface as it extends inwards.

At the outer end of the main platform 115 is a cross-member 130 (FIG. 18) having at each end a shoe 131 adapted to engage the ground and biassed downwards by a spring 116. A pin 132 secured to link 133 has a lost motion connection in a slot 134 in an upstanding part 135 of the shoe. The link 133 is pivoted at 136 to a side wall 119 of the platform and has a pin 137 engageable with a tongue 138 on the part 114.

Figure 18:
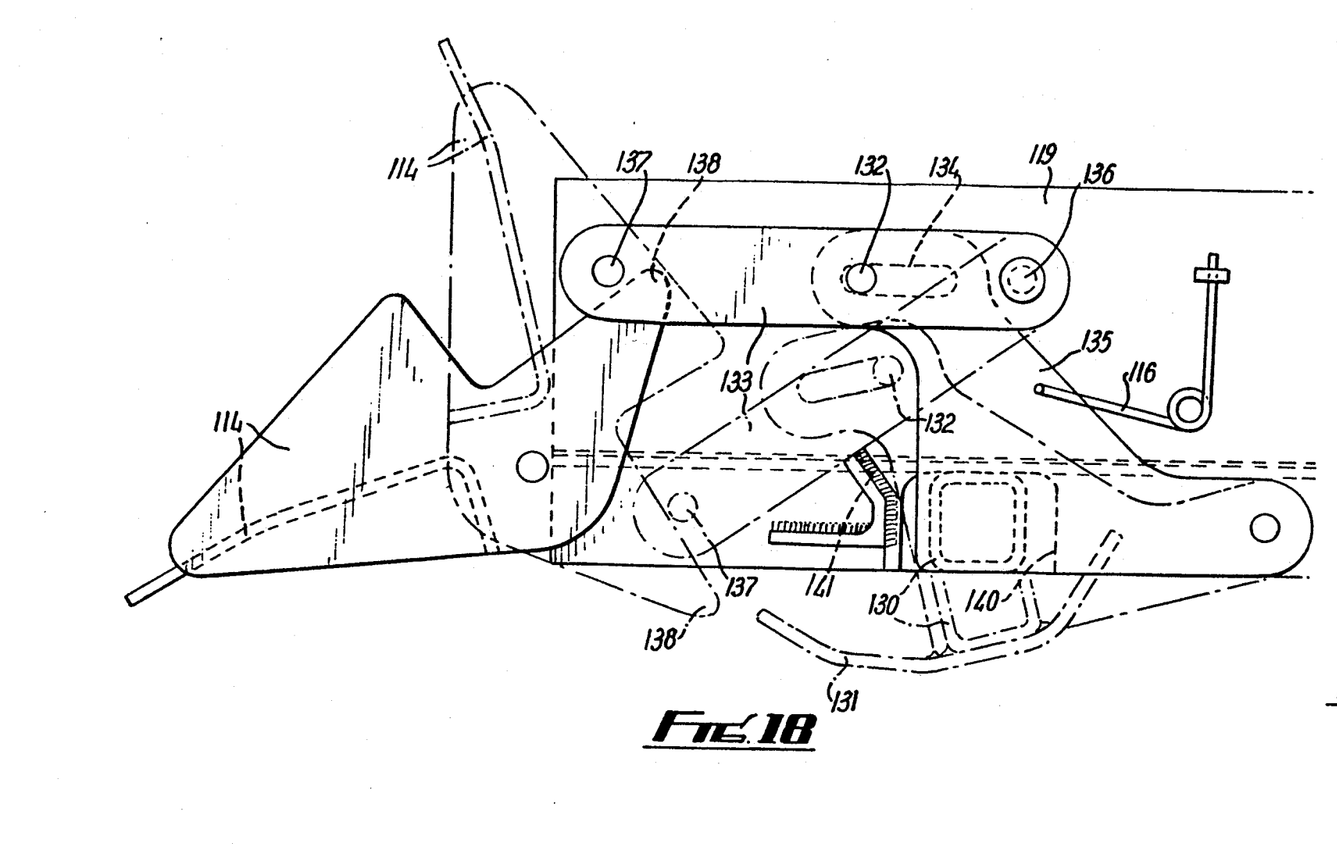
FIG. 18 is a side view of a platform ramp.
Figure 19:
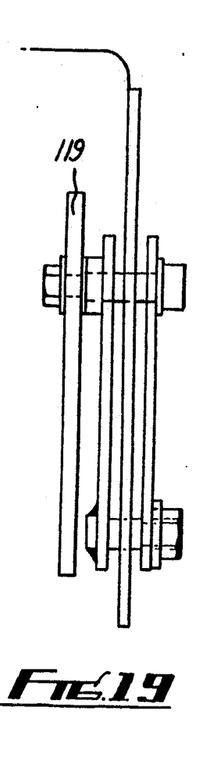
FIG. 19 is an end view of part of FIG. 18.
Figure 20:
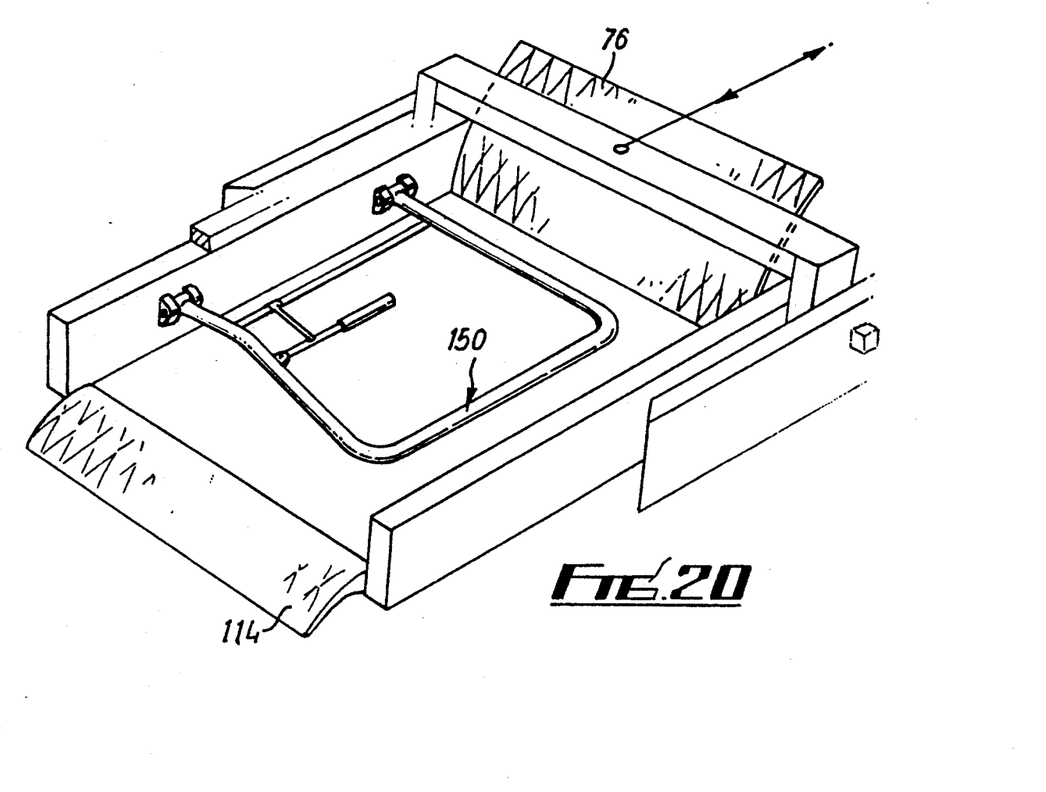
FIG. 20 shows a platform.

When the platform is being lowered, the part 114 is in the dotted position. The shoes 131 engage the ground and are moved upwards relative to the platform 115 against the action of the springs 116 and the links 133 are moved from the dotted to the full line position, taking the links over-centre and the part 114 moves to the full line position under gravity. Upward movement of link 133 is limited by engagement of member 130 in a recess 140 in the structure. The link arrangement provides a mechanical advantage.

The ramp part 114 moves under gravity and thus resists damage by engagement with a stone, and if accidentally engaging a user's foot for example will not damage the foot. On being raised from the ground, the springs 116 move over centre and move the shoes and links downwards and pivot the part 114 to the up, dotted, safety position. Downwards movement of the links is limited by engagement with stops 141. With ramp 114 up, this acts to resist movement of an article, e.g. a wheel-chair, off the platform away from the vehicle.

A pivoted hand rail 150 is provided.

Figure 21:
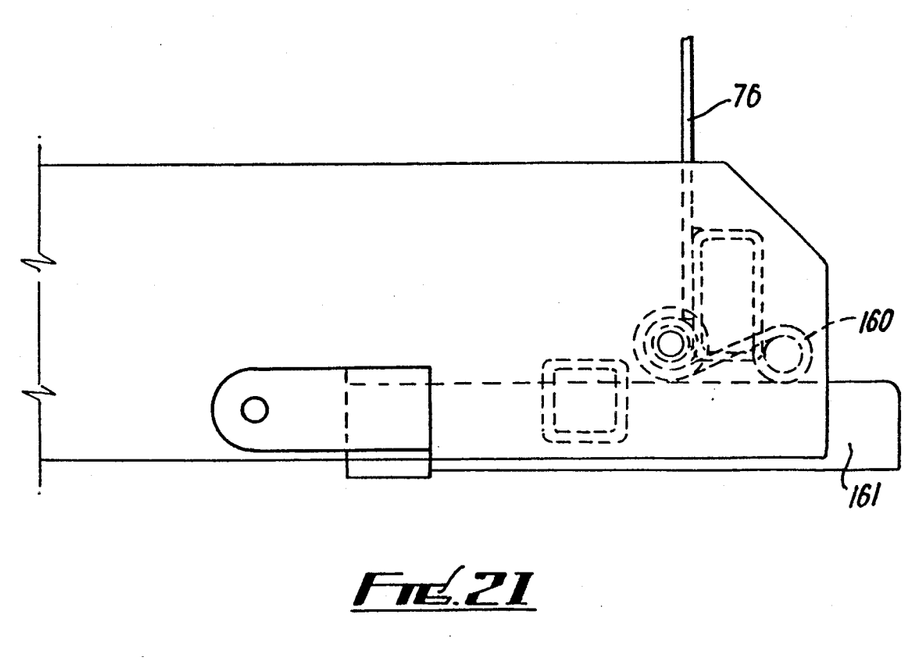
FIG. 21 is a side view of a bridge device.
Figure 22:
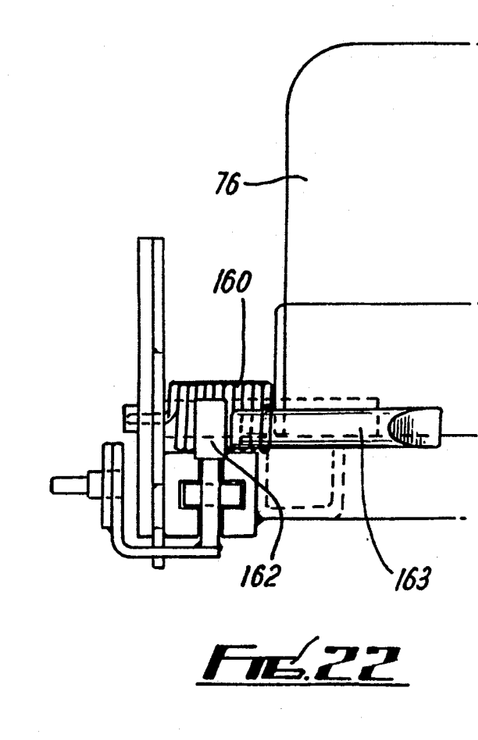
FIG. 22 is an end view of FIG. 21.

FIGS. 21, 22 show an arrangement in which bridge plate 76 is biased down by spring 160. An arm 161 is connected at one end to element 21 and, as the lift is raised, disengages a roller 162 connected to a rod 163 secured to plate 76 so that the plate is rotated to bridging position as the platform reaches the level of the vehicle floor. When the lift is lowered, the arm engages the link and moves the plate against the bias of the spring 160 to the upright position; this is a safety feature.

As shown in FIG. 15, the rails 89 can be modified so as to have a horizontal outer portion 89a connected by a curved portion 89b to a straight, stowage, portion 89c parallel to supports 83, 84. In this way the structure 11, and the platform, are stowed in an inclined position but on being moved outwards adopt a horizontal position.

The lift may include electric control apparatus, including a hand-held switch box, and including limit switches for controlling the in and out movement of structure 11 and the operation of the ram and the up and down movement of the parallelogram.

I claim:

1. A lift adapted to be affixed to a vehicle for movement of a load between raised and lowered positions, the lift comprising:

a platform structure for receiving the load to be moved between the raised and lowered positions;

a mounting structure including at least a pair of elongate spaced-apart rail members adapted to be affixed to said vehicle to receive said platform structure therebetween for storage from a position intermediate said raised and lowered positions;

at least one parallelogram structure coupling said platform structure to said mounting structure and including upper and lower substantially parallel arms with inner and outer ends pivotally coupled respectively to said mounting structure and said platform structure to define an unequal modified parallelogram whereby to carry said platform structure so as to change the inclination motion pattern of the platform as between said raised and lowered positions to incline slightly downwards as it extends outwards from the vehicle when in the lowered position and to incline slightly upwards as it extends outwards from the vehicle in the raised position; and motive means for driving said parallelogram mechanism between said raised and lowered positions.

2. A lift according to claim 1 wherein said parallelogram mechanism has upper and lower arms of different length to vary the incline of said platform structure.

3. A lift according to claim 1 wherein said platform structure further includes a pivotally folding step structure to extend from said vehicle.

4. A lift according to claim 3 wherein said motive means includes a piston/cylinder ram and further including a transverse drive member connected centrally to said piston/cylinder ram and between said parallelogram structure for pivotal motion of said drive member and said parallelogram structures on a common transverse axis to actuate said platform structure.

5. A lift according to claim 1 wherein said elongate spaced running rail members include a curved portion whereby said platform is received in said mounting structure to be stored in an inclined position with respect to said vehicle.

6. A lift according to claim 1 wherein said mounting structure further includes a pair of rails with opposed upper and lower surfaces; rollers on opposite sides of said rails engaging the upper and lower surfaces of said rails and attachment structure for attaching said rollers to carry said parallelogram structure.

7. A lift according to claim 6 further including a motor means for driving said parallelogram structure as accommodated by said rail members.

8. A lift according to claim 1 wherein said motive means includes a piston/cylinder ram coupled to pivotally actuate said parallelogram structures for raising and lowering said platform structure between said raised and lowered positions.

9. A lift according to claim 8 further including a transverse drive member connected to said piston/cylinder ram and said parallelogram mechanisms for pivotal motion of said drive member and said parallelogram structure on a common transverse axis to actuate said platform structure.

10. A lift according to claim 1 wherein said platform structure includes at least one platform and a step part pivotally affixed to said platform, said step part being foldable to provide a step adjacent said vehicle.

* * * * *